United States Patent
Ichikawa (10) Patent No.: US 12,211,321 B2
(45) Date of Patent: Jan. 28, 2025

(54) VEHICLE DIAGNOSIS METHOD, VEHICLE DIAGNOSIS SYSTEM, AND EXTERNAL DIAGNOSIS DEVICE

(71) Applicant: HONDA MOTOR CO., LTD., Tokyo (JP)

(72) Inventor: Tomohito Ichikawa, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 581 days.

(21) Appl. No.: 17/436,668

(22) PCT Filed: Jan. 21, 2020

(86) PCT No.: PCT/JP2020/001956
§ 371 (c)(1),
(2) Date: Sep. 7, 2021

(87) PCT Pub. No.: WO2020/183915
PCT Pub. Date: Sep. 17, 2020

(65) Prior Publication Data
US 2022/0139123 A1 May 5, 2022

(30) Foreign Application Priority Data
Mar. 14, 2019 (JP) .................. 2019-046676

(51) Int. Cl.
*G07C 5/00* (2006.01)
*G07C 5/08* (2006.01)

(52) U.S. Cl.
CPC .......... *G07C 5/008* (2013.01); *G07C 5/0808* (2013.01); *G07C 5/085* (2013.01)

(58) Field of Classification Search
CPC ..... G01M 17/007; G07C 5/008; G07C 5/085; G07C 5/0808; Y02P 90/30; G06Q 50/04; G06Q 10/04
See application file for complete search history.

(56) References Cited

U.S. PATENT DOCUMENTS

| 6,044,315 A * | 3/2000 | Honeck .................. G01C 17/30 340/459 |
| 6,564,172 B1 * | 5/2003 | Till ........................ G01F 9/008 700/282 |

(Continued)

FOREIGN PATENT DOCUMENTS

JP 09-226389 9/1997

OTHER PUBLICATIONS

International Search Report and Written Opinion for International Application No. PCT/JP2020/001956 mailed on Mar. 24, 2020, 8 pages.

*Primary Examiner* — Thomas Ingram
*Assistant Examiner* — Michael J Herrera
(74) *Attorney, Agent, or Firm* — Amin, Turocy & Watson, LLP (57) ABSTRACT

Provided are a vehicle diagnosis method, vehicle diagnosis system, and external diagnosis device capable of optimizing the amount of fuel supplied to a vehicle throughout a factory. This vehicle diagnosis method for using an external diagnosis device that communicates with an engine ECU to determine the suitability of the fuel consumption amount of a vehicle comprises: a step for calculating and storing the fuel consumption amount; a step for acquiring the fuel consumption amount from the engine ECU; a step for determining whether the fuel consumption amount is less than or equal to a threshold; and a step for permitting the shifting of the vehicle to the next step if the fuel consumption amount has been determined to be less than or equal to the threshold and instructing that fuel be supplied if the fuel consumption amount has been determined to be greater than the threshold.

5 Claims, 8 Drawing Sheets

(56) References Cited

U.S. PATENT DOCUMENTS

| | | | | |
|---|---|---|---|---|
| 10,056,008 | B1* | 8/2018 | Sweany | G09B 19/167 |
| 10,391,872 | B2* | 8/2019 | Gaither | B60L 53/68 |
| 10,504,303 | B2* | 12/2019 | Park | H02J 7/0048 |
| 2006/0208693 | A1* | 9/2006 | Emori | H02J 7/005 |
| | | | | 320/106 |
| 2006/0287841 | A1* | 12/2006 | Hoshi | E02F 9/26 |
| | | | | 702/182 |
| 2010/0076878 | A1* | 3/2010 | Burr | G06Q 30/04 |
| | | | | 701/123 |
| 2013/0116868 | A1* | 5/2013 | Erko | B60L 53/64 |
| | | | | 320/109 |
| 2016/0167640 | A1* | 6/2016 | Zettel | B60W 20/12 |
| | | | | 701/22 |
| 2016/0190820 | A1* | 6/2016 | Chae | H01M 10/613 |
| | | | | 320/134 |
| 2016/0252938 | A1* | 9/2016 | Oishi | G11C 5/148 |
| | | | | 713/300 |
| 2017/0039786 | A1* | 2/2017 | DeVore | G07C 5/0808 |
| 2017/0337618 | A1* | 11/2017 | Berkooz | B60R 16/0236 |
| 2018/0052635 | A1* | 2/2018 | Obara | G06F 12/0246 |
| 2018/0143095 | A1* | 5/2018 | Fujita | G01L 27/005 |
| 2018/0236898 | A1* | 8/2018 | Ji | B60K 35/00 |
| 2018/0340783 | A1* | 11/2018 | Suzuki | G06Q 10/04 |
| 2020/0043257 | A1* | 2/2020 | Venkiteswaran | G07C 5/085 |
| 2020/0079299 | A1* | 3/2020 | Salter | B60K 25/02 |
| 2020/0093053 | A1* | 3/2020 | Ehlert | G06Q 50/02 |
| 2020/0211043 | A1* | 7/2020 | Hori | G08G 1/0112 |

* cited by examiner

| ITEM | MINIMUM AMOUNT REQUIRED FOR FIRST ENGINE EXPLOSION | FUEL REQUIRED FOR TRAVELING IN FACTORY | | | | FUEL REQUIRED AFTER SHIPMENT FROM FACTORY | TOTAL |
|---|---|---|---|---|---|---|---|
| | | INSPECTION PROCESS | TRAVELING IN FACTORY (EXCLUDING INSPECTION/ADJUSTMENT) | ADJUSTMENT WORK | IDLING | LOGISTICS PROCESS | |
| COMPARATIVE EXAMPLE | 2.25 | 1.0 | 0.25 | 3.0 | 3.0 | 0.5 | 10.0 |
| EXAMPLE | 2.25 | 1.0 | 0.25 | 0 | 1.0 | 0.5 | 5.0 |
| DIFFERENCE | 0 | 0 | 0 | −3.0 | −2.0 | 0 | −5.0 |

(UNIT: LITER)

VEHICLE DIAGNOSIS METHOD, VEHICLE DIAGNOSIS SYSTEM, AND EXTERNAL DIAGNOSIS DEVICE

TECHNICAL FIELD

The present invention relates to a vehicle diagnosis method, a vehicle diagnosis system, and an external diagnosis device, and specifically relates, for example, to a vehicle diagnosis method, a vehicle diagnosis system, and an external diagnosis device which are suitably applied to diagnosis of a fuel consumption amount in a plant after fuel is supplied to a vehicle in a vehicle production line.

BACKGROUND ART

In general, in a production line of a vehicle such as an automobile, after a predetermined assembling operation is completed in an assembly process, a fuel tank of the vehicle is supplied with fuel necessary, for example, for the vehicle to travel in subsequent processes after the assembly process.

With regard to the fuel supplied in the production line of the vehicle, further optimization of the amount of fuel supplied to the fuel tank has been required in order to reduce production costs.

For example, JP H09-226389 A discloses a vehicle fuel supply device in which a sub tank that stores a minimum amount of fuel required for an initial start of an engine is provided inside a main tank.

In this vehicle fuel supply device, a suction port of a fuel pump is provided in the vicinity of the bottom surface of the sub tank, and an opening of a fuel supply pipe is provided above the sub tank. The fuel discharged from the opening of the fuel supply pipe always flows into the sub tank. Therefore, the sub tank can store the minimum amount of fuel required for the initial start of the engine. As a result, the fuel supply amount in the vehicle production line can be reduced.

SUMMARY OF INVENTION

However, JP H09-226389 A discloses a technique focusing only on reduction of the amount of fuel required for the initial start of the engine, and does not give any consideration to the optimization of the amount of fuel supplied to the vehicles in the entire plant, including the amount of fuel necessary, for example, for the vehicle to travel in the subsequent processes after the assembly process and the amount of fuel to replenish the fuel consumed in the plant.

The present invention has been made in view of the above problem and the object thereof is to provide a vehicle diagnosis method, a vehicle diagnosis system, and an external diagnosis device capable of optimizing the amount of fuel supplied to vehicles in the entire plant.

According to a first aspect of the present invention, there is provided a vehicle diagnostic method for, after fuel is supplied to a vehicle in a production line of the vehicle, diagnosing whether or not a fuel consumption amount of the vehicle is appropriate by using an external diagnosis device configured to communicate with an electronic control unit mounted on the vehicle, the vehicle diagnosis method comprising: a step of causing the electronic control unit to calculate and store the fuel consumption amount; a step of causing the external diagnosis device to acquire the fuel consumption amount from the electronic control unit; a step of causing the external diagnosis device to determine whether or not the fuel consumption amount is equal to or less than a threshold value; and a step of causing the external diagnosis device to permit transfer of the vehicle to a next process when determining that the fuel consumption amount is equal to or less than the threshold value, and to give an instruction to supply additional fuel when determining that the fuel consumption amount is greater than the threshold value.

According to a second aspect of the present invention, there is provided a vehicle diagnosis system that, after fuel is supplied to a vehicle in a production line of the vehicle, diagnoses whether or not a fuel consumption amount of the vehicle is appropriate by using an external diagnosis device configured to communicate with an electronic control unit mounted on the vehicle, wherein the electronic control unit includes a storage unit configured to store the fuel consumption amount, the external diagnosis device includes: a fuel consumption amount acquisition unit configured to acquire the fuel consumption amount from the electronic control unit; and a fuel consumption amount determination unit configured to determine whether or not the fuel consumption amount is equal to or less than a threshold value, and the fuel consumption amount determination unit permits transfer of the vehicle to a next process when determining that the fuel consumption amount is equal to or less than the threshold value, and gives an instruction to supply additional fuel when determining that the fuel consumption amount is greater than the threshold value.

According to a third aspect of the present invention, there is provided an external diagnosis device that, after fuel is supplied to a vehicle in a production line of the vehicle, diagnoses whether or not a fuel consumption amount of the vehicle is appropriate by communicating with an electronic control unit mounted on the vehicle, the external diagnosis device comprising: a fuel consumption amount acquisition unit configured to acquire the fuel consumption amount from the electronic control unit; and a fuel consumption amount determination unit configured to determine whether or not the fuel consumption amount is equal to or less than a threshold value, wherein the fuel consumption amount determination unit permits transfer of the vehicle to a next process when determining that the fuel consumption amount is equal to or less than the threshold value, and gives an instruction to supply additional fuel when determining that the fuel consumption amount is greater than the threshold value.

According to the present invention, after the fuel is supplied to the vehicle in the production line of the vehicle, the external diagnosis device acquires the fuel consumption amount from the electronic control unit of the vehicle, determines whether or not the fuel consumption amount is equal to or less than the threshold value, and gives an instruction to supply additional fuel when determining that the fuel consumption amount is greater than the threshold value. Therefore, the operator can supply (inject) the additional fuel according to the actual fuel consumption amount. For this reason, fuel required for each vehicle can be supplied thereto without excess or deficiency while reducing the initial fuel supply amount for the vehicle to the minimum necessary amount, and it is possible to optimize the amount of fuel supplied to the vehicles in the entire plant.

DESCRIPTION OF EMBODIMENTS

Embodiments of a vehicle diagnosis method, a vehicle diagnosis system, and an external diagnosis device according to the present invention will be described in detail below with reference to the accompanying drawings.

[Configuration]

Figure 1:
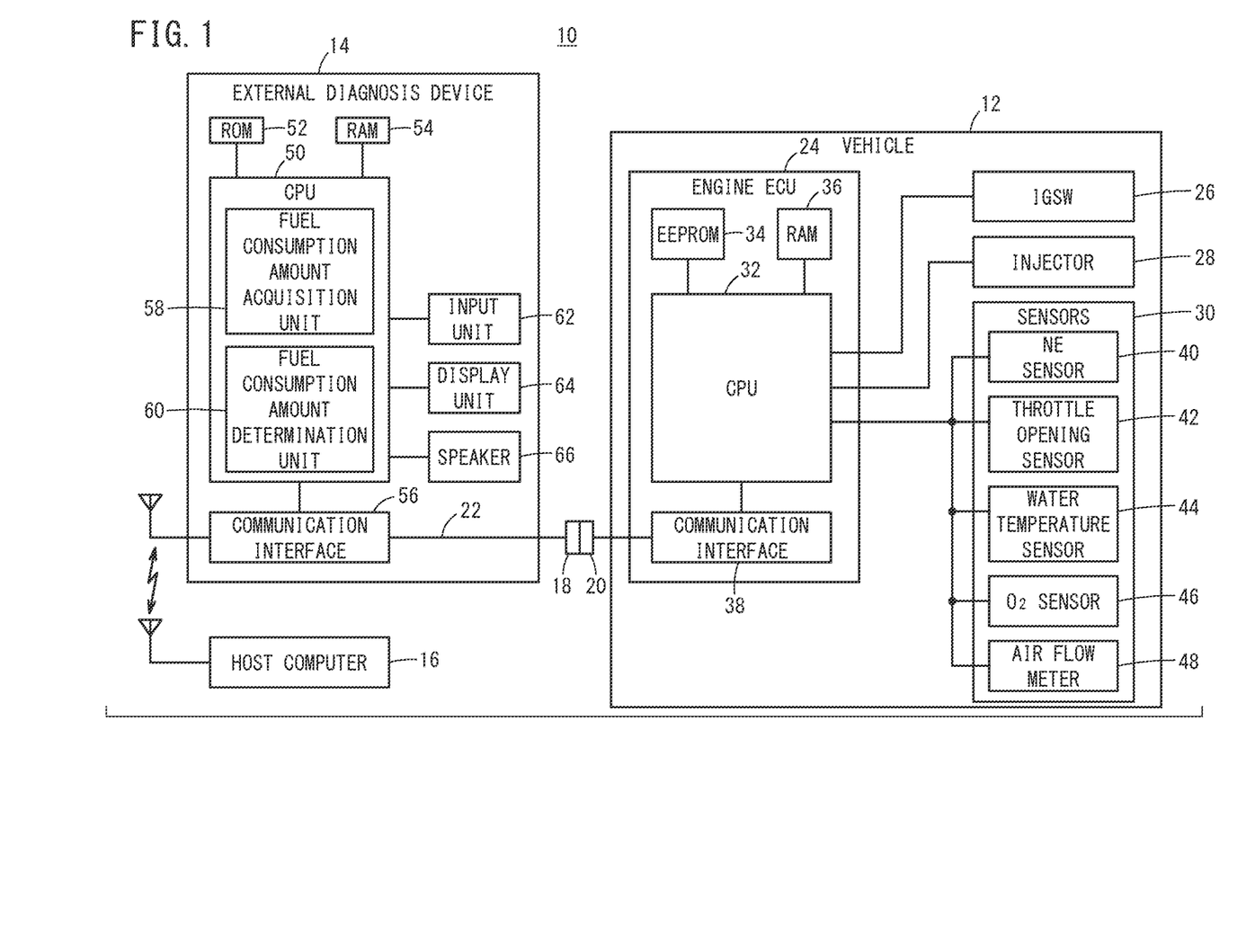
FIG. 1 is a block diagram showing an example of a configuration of a vehicle diagnosis system according to an embodiment of the present invention.

FIG. 1 is a block diagram showing an example of a configuration of a vehicle diagnosis system 10 that includes an external diagnosis device 14 according to an embodiment of the present invention and that performs a vehicle diagnosis method according to the embodiment.

The vehicle diagnosis system 10 includes a vehicle 12 as a diagnosis target, the external diagnosis device 14 that executes various diagnoses of the vehicle 12 from the outside of the vehicle 12, and a host computer 16 that provides a parameter file necessary for various diagnoses to the external diagnosis device 14.

The vehicle 12 and the external diagnosis device 14 are connected to each other by a communication cable 22 via connectors 18 and 20. The external diagnosis device 14 can wirelessly communicate with the host computer 16.

In this embodiment, the vehicle 12 is assumed to be a four-wheeled gasoline vehicle having a gasoline engine (not shown). However, the vehicle 12 may be any vehicle having an internal combustion engine, and may be, for example, a hybrid vehicle having a gasoline engine and an electric motor, a diesel engine vehicle using light oil as fuel, or a liquefied petroleum gas (LPG) vehicle using LPG as fuel. The number of wheels of the vehicle 12 is not limited to four, and the vehicle 12 may be a two-wheeled vehicle, a three-wheeled vehicle, a six-wheeled vehicle, or the like.

As shown in FIG. 1, the vehicle 12 includes an engine electronic control unit 24 (hereinafter referred to as the "engine ECU 24") that controls an engine (not shown), an ignition switch 26 (hereinafter referred to as the "IGSW 26"), an injector 28, and various sensors 30.

The engine ECU 24 is a computer including a microcomputer, and includes a central processing unit (CPU) 32, a ROM as a memory (an EEPROM 34 in this embodiment), a random access memory (RAM) 36, a communication interface 38, input/output devices such as an A/D converter and a D/A converter, a timer serving as a timer unit, and the like.

By reading and executing programs recorded in the ROM, the CPU 32 functions as various function realizing units (function realizing means), such as, for example, a control unit, an arithmetic unit, and a processing unit. The ROM stores an ECU identification code (ECU ID) of the engine ECU 24, in addition to various programs.

The IGSW 26 is a rotary switch. In the IGSW 26, from the left side toward an instrument panel (not shown), an "OFF" position, an "ACC" (accessory) position, and an "ON" position can be selected. When the IGSW 26 is further rotated to the right (in the clockwise direction) from the "ON" position, it reaches the "ST" (engine start) position. As a result, the engine is started.

When the vehicle 12 has a so-called smart start function, the IGSW 26 may be a push switch used for the so-called smart start function.

In the present embodiment, when the IGSW 26 is in the "ACC" position or the "ON" position, electric power is supplied from a battery (not shown) to the engine ECU 24. When the IGSW 26 is in the "OFF" position, the supply of electric power from the battery to the engine ECU 24 is basically stopped.

The injector 28 injects fuel into air that has passed through a throttle valve (not shown), based on an instruction from the engine ECU 24.

The various sensors 30 include an engine speed sensor (NE sensor) 40, a throttle opening sensor 42, a water temperature sensor 44, an 02 sensor 46, an air flow meter 48, and the like. The engine ECU 24 controls the fuel injection of the injector 28 based on the detection signals from the various sensors 30.

The external diagnosis device 14 includes a central processing unit (CPU) 50, a ROM 52, a RAM 54, a communication interface 56, input/output devices such as an A/D converter and a D/A converter, a timer serving as a timer unit, and the like.

By reading and executing programs recorded in the ROM 52, the CPU 50 functions as various function realizing units (function realizing means), such as, for example, a control unit, an arithmetic unit, and a processing unit. In the present embodiment, the CPU 50 functions as: a fuel consumption amount acquisition unit 58 that acquires a fuel consumption amount Afp described later from the engine ECU 24; and a fuel consumption amount determination unit 60 that determines whether or not the fuel consumption amount Afp is equal to or less than a threshold value Th.

The external diagnosis device 14 is a dedicated terminal called, for example, a Line End Tester (LET) or the like, and is portable by the operator. Therefore, the external diagnosis device 14 is provided with: an input unit 62 constituted by a keyboard, a numeric keypad, a fuel consumption amount erasing button described later, and the like; a display unit 64 that displays the result of processing performed by the CPU 50; and a speaker 66 that outputs sound such as an alarm.

The host computer 16 has a parameter file necessary for vehicle diagnosis performed by the external diagnosis device 14. The parameter file includes various parameters necessary for vehicle diagnosis, such as an ECU identification code for identifying the engine ECU 24, and the threshold value Th used for determining the fuel consumption amount Afp. The parameter file is installed in the external diagnosis device 14 in advance from the host computer 16 before the vehicle diagnosis is executed.

Figure 2:
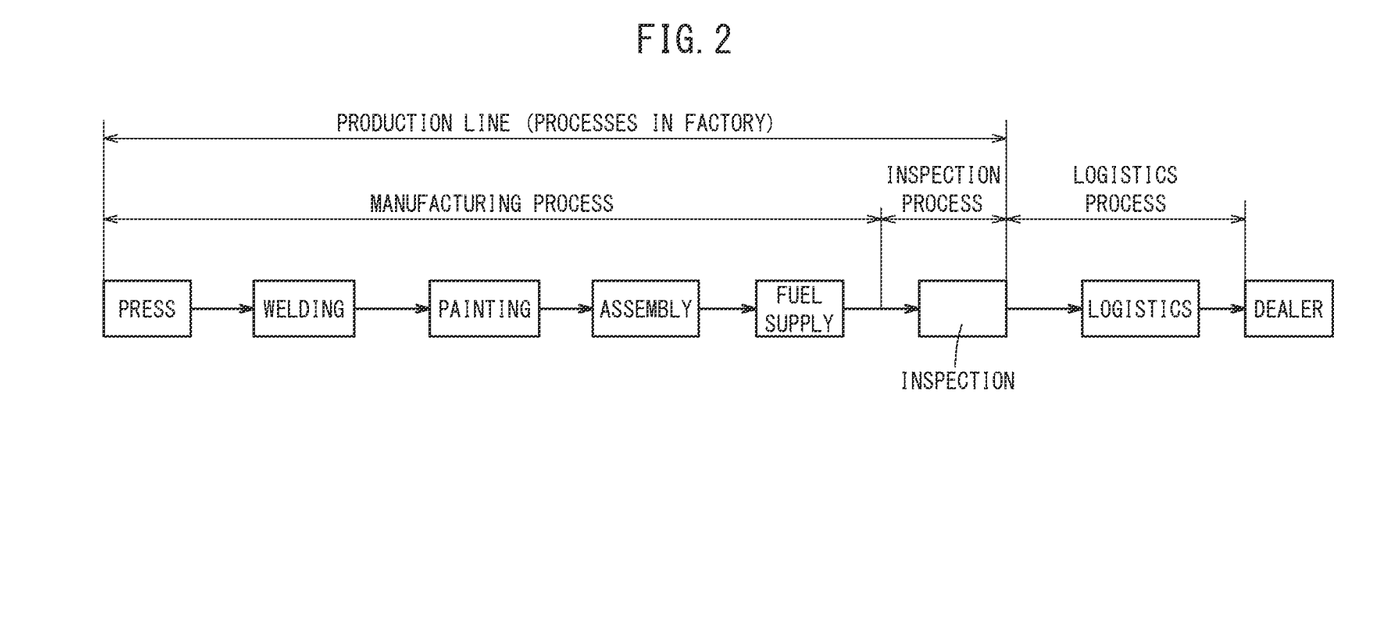
FIG. 2 is an explanatory diagram showing processes from a production line of a vehicle to a dealer.

FIG. 2 shows an example of processes from a production line of the vehicle 12 to a dealer (delivery destination). As shown in FIG. 2, the production line of a production plant of the vehicle 12 mainly includes a manufacturing process and an inspection process. Hereinafter, the entire production plant including the building and the site may be referred to as a "factory". The manufacturing process includes a press process, a welding process, a painting process, and an assembly process. After a predetermined assembling operation is completed in the assembly process, a fuel tank of the vehicle 12 is supplied with fuel necessary, for example, for the vehicle 12 to travel in subsequent processes after the assembly process. When the fuel is supplied to the vehicle 12, the vehicle 12 proceeds to the inspection process. The vehicle 12 that has passed the inspection is moved out of the factory, and is delivered to a dealer (delivery destination) through a logistics process.

The threshold value Th used for determining the fuel consumption amount Afp is a predetermined value equal to or greater than a value calculated, for example, by adding a minimum amount of fuel required for traveling and idling of the vehicle 12 in the inspection process, and a minimum amount of fuel required for traveling and idling of the vehicle 12 in the factory other than in the inspection process, after the fuel has been supplied to the vehicle 12 after the assembly process of the production line. The threshold value Th is set in advance for each vehicle type.

[Operation]

The operation of the vehicle diagnosis system 10 including the external diagnosis device 14 basically configured as described above will be described in detail with reference to flowcharts shown in FIGS. 3 and 4. Unless otherwise specified, the CPU 32 and the CPU 50 execute the processing shown in the flowchart. However, since it is redundant to refer to the CPU 32 and the CPU 50 each time, they are referred to as necessary.

[Acquisition of Fuel Consumption Amount Afp]

A flow in which the CPU 32 acquires the fuel consumption amount Afp of the vehicle 12 and stores it in the RAM 36 will be described with reference to FIG. 3.

Here, the initial state is a state immediately after fuel required for traveling or the like of the vehicle 12 is supplied to the fuel tank (not shown) of the vehicle 12 after a predetermined assembling operation is completed in the assembly process of the production line. In other words, the initial state is a state immediately before the vehicle 12 is inspected in the inspection process.

In this initial state, the external diagnosis device 14 is connected to the vehicle 12 via the connectors 18 and 20 and is supplied with power from a battery (not shown) of the vehicle 12. The parameter file necessary for the vehicle diagnosis is installed in the ROM 52 of the external diagnosis device 14.

Figure 3:
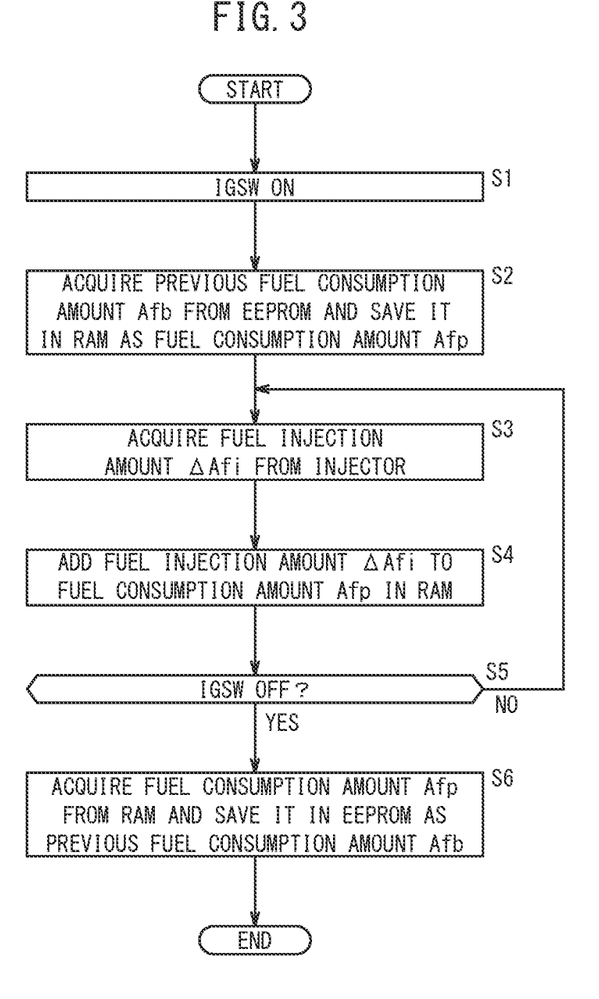
FIG. 3 is a flowchart showing fuel consumption amount acquisition processing performed by an engine ECU.

As shown in FIG. 3, in step S1, it is confirmed whether or not the position of the IGSW 26 is changed to "ON". Here, it is assumed that the position of the IGSW 26 changes from "ON" to "ST" and returns to "ON", and the engine of the vehicle 12 starts.

Next, the process proceeds from step S1 to step S2, and the CPU 32 reads a previous fuel consumption amount Afb from the EEPROM 34, and writes it into the RAM 36 as the fuel consumption amount Afp (Afp<-Afb).

Here, since the state where the IGSW 26 is turned "ON" for the first time after the fuel has been supplied to the fuel tank of the vehicle 12 is assumed, the previous fuel consumption amount Afb read from the EEPROM 34 is initialized to 0.

In step S3, the CPU 32 acquires a fuel injection amount ΔAfi for each minute time from the injector 28.

In step S4, the CPU 32 calculates a new fuel consumption amount Afp as an integrated value by adding the fuel injection amount ΔAfi for each minute time acquired in step S3 to the fuel consumption amount Afp after rounding up the fraction of the fuel injection amount ΔAfi in units of 10 cubic centimeters, for example. The CPU 32 stores the new fuel consumption amount Afp in the RAM 36 (Afp<-Afp+ΔAfi).

Next, the process proceeds to step S5, and it is confirmed whether or not the IGSW 26 is "OFF". While the IGSW 26 is "ON" (step S5: NO), step S3 and step S4 are repeatedly executed at a predetermined interval (for example, a cycle of several milliseconds to several hundred milliseconds).

On the other hand, when it is confirmed that the IGSW 26 is turned "OFF" in step S5 (step S5: YES), the CPU 32 reads the fuel consumption amount Afp stored in the RAM 36, and records it in the EEPROM 34 as the previous fuel consumption amount Afb (Afb<-Afp).

When the IGSW 26 is turned "OFF", the power supply to the engine ECU 24 is stopped. Therefore, the fuel consumption amount Afp in the RAM 36, which is a volatile memory, is erased (reset). On the other hand, the previous fuel consumption amount Afb in the EEPROM 34, which is a nonvolatile memory, is not erased (not reset) and is held in the EEPROM 34.

When the IGSW 26 is turned "ON" next time, the processing shown in FIG. 3 is restarted (from step S1). In step S2, the previous fuel consumption amount Afb is read from the EEPROM 34, and is written into the RAM 36 as the fuel consumption amount Afp (Afp<-Afb). After step S3, the fuel injection amount ΔAfi for each minute time is added to the fuel consumption amount Afp in the RAM 36, whereby a new fuel consumption amount Afp as an integrated value is calculated (Afp<-Afp+ΔAfi).

[Fuel Consumption Amount Determination Processing]

Next, the flow of fuel consumption amount determination processing performed by the external diagnosis device 14 will be described with reference to FIG. 4.

The external diagnosis device 14 according to the embodiment of the present invention can be used for vehicle diagnosis in various environments such as vehicle diagnosis in a repair plant as well as vehicle diagnosis in a production plant (factory) of the vehicle 12. Hereinafter, the operation of the external diagnosis device 14 will be described by taking, as an example, vehicle diagnosis performed in an "inspection process (pre-shipment inspection)" or the like in the production plant (factory) of the vehicle 12.

Figure 4:
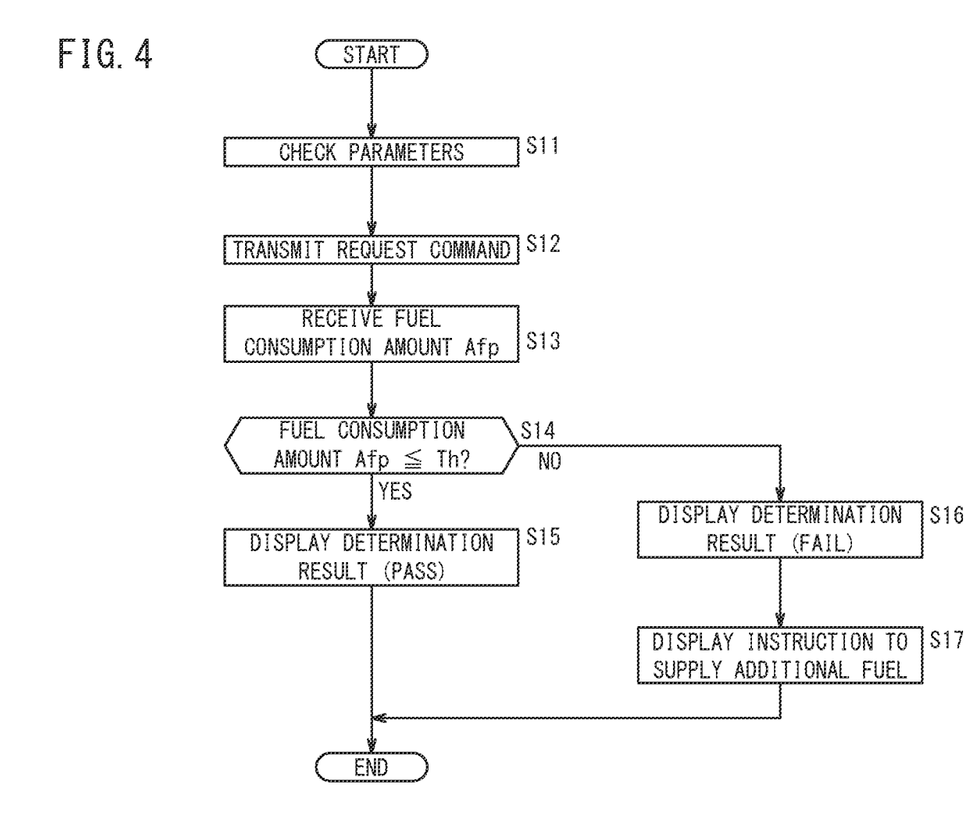
FIG. 4 is a flowchart showing fuel consumption amount determination processing performed by an external diagnosis device.

As shown in FIG. 4, in step S11, the CPU 50 of the external diagnosis device 14 checks various parameters and establishes a communication connection with the engine ECU 24.

When the communication connection between the external diagnosis device 14 and the engine ECU 24 is established, the process proceeds to step S12, and the fuel consumption amount acquisition unit 58 of the CPU 50 requests the engine ECU 24 to transmit the fuel consumption amount Afp. (The CPU 50 transmits a request command to the engine ECU 24.)

The engine ECU 24 that has received the request command reads the fuel consumption amount Afp from the RAM 36 and transmits it to the external diagnosis device 14. In step S13, the fuel consumption amount acquisition unit 58 of the external diagnosis device 14 receives the fuel consumption amount Afp from the engine ECU 24.

When the fuel consumption amount acquisition unit 58 receives the fuel consumption amount Afp from the engine ECU 24, then in step S14, the fuel consumption amount determination unit 60 of the external diagnosis device 14 compares the fuel consumption amount Afp with the threshold value Th set in the parameter file in advance.

In step S14, when the fuel consumption amount Afp is equal to or less than the threshold value Th (Afp≤Th, step S14: YES), it is determined that the amount of fuel (fuel consumption amount Afp) consumed by the vehicle 12 during traveling and idling in the factory is within an appropriate range. The determination result by the fuel consumption amount determination unit 60 is "pass (OK)".

When the result of the fuel consumption amount determination is "pass (OK)", the process proceeds to step S15. The CPU 50 causes both the value of the fuel consumption amount Afp and the determination result to be simultaneously displayed on the display unit 64. For example, the CPU 50 causes "Gas Consumption: 1.0 L/Shipment: "OK"" to be displayed on the display unit 64. The display of the determination result of "pass (OK)" also serves as permission (work instruction) for transferring the vehicle 12 to the next process. The operator who has confirmed the determination result transfers the vehicle 12 to the logistics process, which is the next process.

On the other hand, when the fuel consumption amount Afp is greater than the threshold value Th (Afp>Th, step S14: NO), it is determined that the amount of fuel (fuel consumption amount Afp) consumed by the vehicle 12 during traveling and idling in the factory exceeds the appropriate range and is in the inappropriate range. The determination result by the fuel consumption amount determination unit 60 is "fail (NG)".

When the result of the fuel consumption amount determination is "fail (NG)", the process proceeds to step S16. The external diagnosis device 14 causes both the value of the fuel consumption amount Afp and the determination result to be simultaneously displayed on the display unit 64. For example, the CPU 50 causes "Gas Consumption: 3.0 L/Shipment: NG" to be displayed on the display unit 64.

Further, in step S17, the external diagnosis device 14 displays, on the display unit 64, a notification (additional fuel supply instruction) to prompt the operator to supply additional fuel. For example, the CPU 50 causes characters "Please supply additional fuel" to be displayed on the display unit 64. In order to attract the attention of the operator, it is preferable that the characters are displayed on the display unit 64 in a blinking manner, or a warning sound is emitted from the speaker 66. The operator who has confirmed the display of the characters can supply necessary fuel according to the value of the fuel consumption amount Afp.

[Comparison Between Comparative Example and Example of Embodiment]

An initial fuel supply amount for the vehicle 12 in the production line will be described by comparing a comparative example and an example according to an embodiment of the present invention with reference to FIG. 5.

Figure 5:
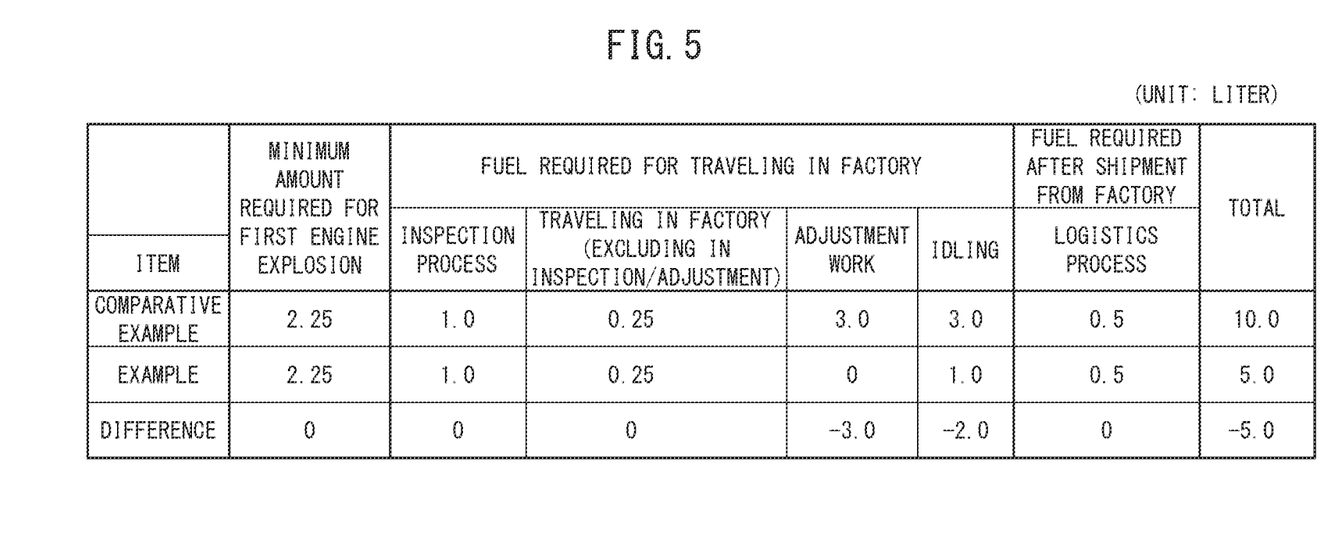
FIG. 5 is an explanatory diagram showing comparison between an example according to an embodiment of the present invention and a comparative example.

In the upper row of FIG. 5, a "comparative example" is illustrated. The "comparative example" is a hypothetical example for explaining the initial fuel supply amount for the vehicle 12. In the "comparative example", for example, a total of 10.0 liters of fuel is supplied to the vehicle 12 as the initial fuel supply amount in the production line.

As shown in FIG. 5, the breakdown of the initial fuel supply amount of the "comparative example" is as follows: the amount of fuel required for the first explosion of the engine is 2.25 liters; the amount of fuel required for traveling and idling in the inspection process is 1.0 liter; the amount of fuel required for traveling in the factory, excluding in the inspection process and adjustment work, is 0.25 liters; when it is determined in the inspection process that adjustment work is necessary and the vehicle 12 is returned to the subsequent process, the amount of fuel required for the adjustment work is 3.0 liters; the amount of fuel required for idling in the factory, excluding in the inspection process and adjustment work, is 3.0 liters; and the amount of fuel required for traveling and idling in the logistics process after the vehicle 12 is shipped from the factory is 0.5 liters.

In general, it is known that the amount of fuel consumed in the factory after the fuel is supplied to the vehicle 12 in the production line varies greatly from vehicle to vehicle. This is because, after the inspection process, depending on whether or not the adjustment work is performed, the travel distance of the vehicle in the factory varies from vehicle to vehicle, and depending on the operating conditions of the production line, the length of the idle time varies from vehicle to vehicle.

From the viewpoint of prevention of fuel shortage, when the vehicle 12 is shipped from the factory, it is necessary for the fuel tank to store a larger amount of fuel than the minimum amount required in the logistics process or the like after shipment.

In the "comparative example", the operator does not confirm the amount of fuel consumed by the vehicle 12 in the factory after the fuel is supplied to the vehicle 12 in the production line. Therefore, the initial fuel supply amount in the "comparative example" is set to an amount with a margin, assuming a case where the travel distance in the factory is the longest and the idle time in the factory is the longest.

On the other hand, in the "example", the operator can confirm the fuel consumption amount Afp actually consumed in the factory, by using the external diagnosis device 14 (step S15 and step S16 in FIG. 4). Therefore, additional fuel can be supplied to the vehicle 12 for which the fuel consumption amount Afp exceeds the threshold value Th. On the other hand, the vehicle 12, for which the fuel consumption amount Afp is equal to or less than the threshold value Th, can be shipped from the factory without being supplied with additional fuel.

Therefore, in the "example" illustrated in the lower row of FIG. 5, the amount of fuel required for the adjustment work is 0 liters, and the amount of fuel required for idling is 1.0 liter. Thus, the initial fuel supply amount in the "example" is 5.0 liters in total, which is half the amount in the "comparative example". Further, in the "example", additional fuel may be supplied only to some vehicles 12 for which the fuel consumption amount Afp exceeds the threshold value Th. In this way, in the "example", the initial fuel supply amount for the vehicle 12 can be reduced to the minimum necessary amount. Since the operator can know the fuel consumption amount Afp in the factory as necessary and can supply the fuel in an amount required for each vehicle without excess or deficiency, it is possible to optimize the amount of fuel supplied to the vehicles 12 in the factory (the entire production plant of the vehicle 12).

In this "example", the threshold value Th set in the external diagnosis device 14 is a predetermined value equal to or greater than 2.25 liters obtained, for example, by adding together: the amount of fuel (1.0 liter) required for traveling and idling in the inspection process; the amount of fuel (0.25 liters) required for traveling in the factory, excluding in the inspection process and adjustment work; and the amount of fuel (1.0 liter) required for idling in the factory, excluding in the inspection process and adjustment work.

Modified Example

Figure 6:
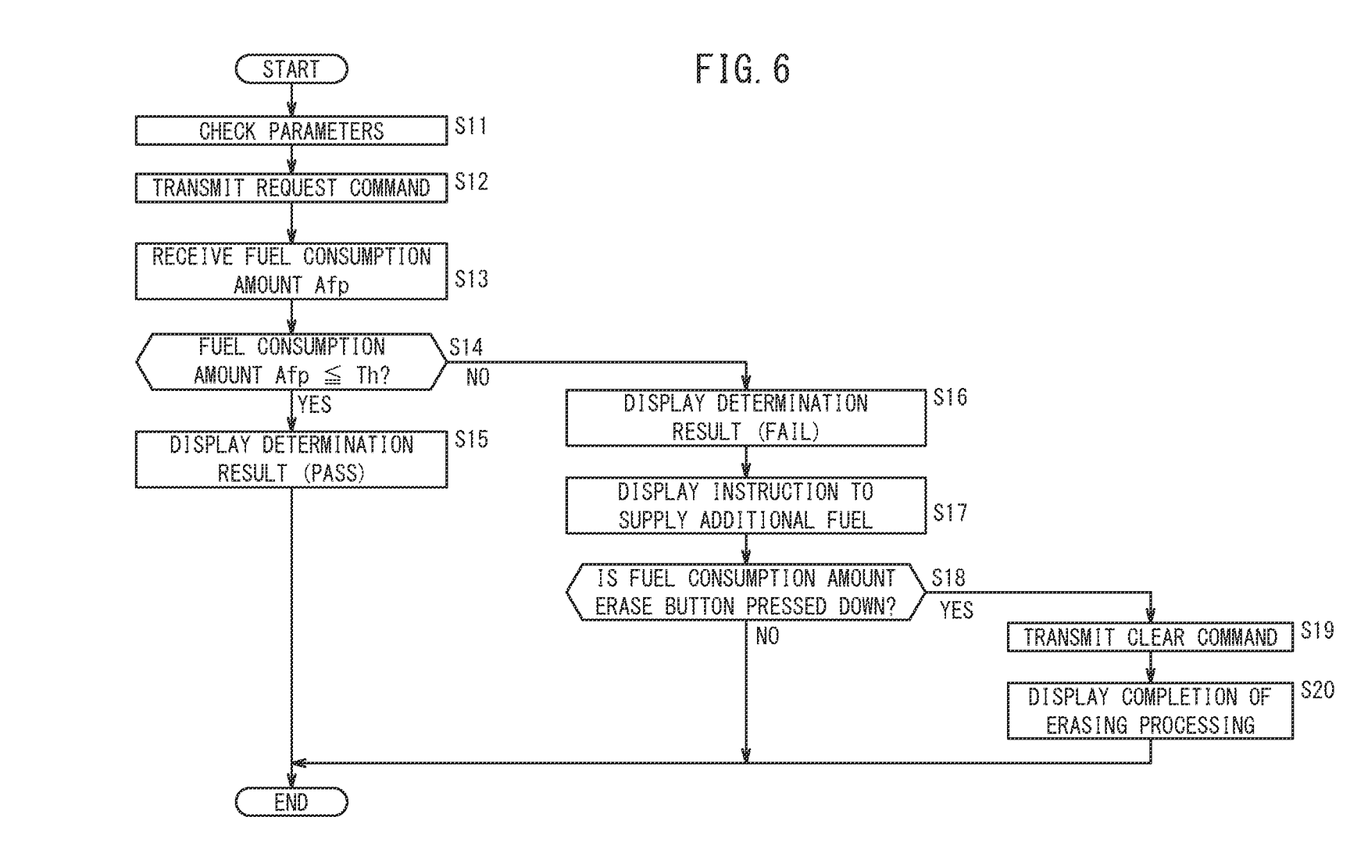
FIG. 6 is a flowchart showing fuel consumption amount determination processing in a modified example.

A modified example will be described with reference to a flowchart of FIG. 6.

In the above-described example, in step S17 of FIG. 4, when the notification prompting the supply of additional fuel is displayed on the display unit 64, the processing related to the fuel consumption amount determination ends. The modified example illustrated in FIG. 6 is different from the above-described example in that steps S18 to S20 are added after step S17.

Specifically, after step S17, a step of erasing (resetting) the fuel consumption amount Afp and the previous fuel consumption amount Afb that are recorded in the engine ECU 24 is added.

In this modified example, after step S17, the external diagnosis device 14 receives an operation, by the operator, of pressing down a fuel consumption amount erase button (not shown) in step S18.

When the operator presses down the fuel consumption amount erase button (step S18: YES), a clear command is transmitted to the engine ECU 24 in step S19.

Figure 7:
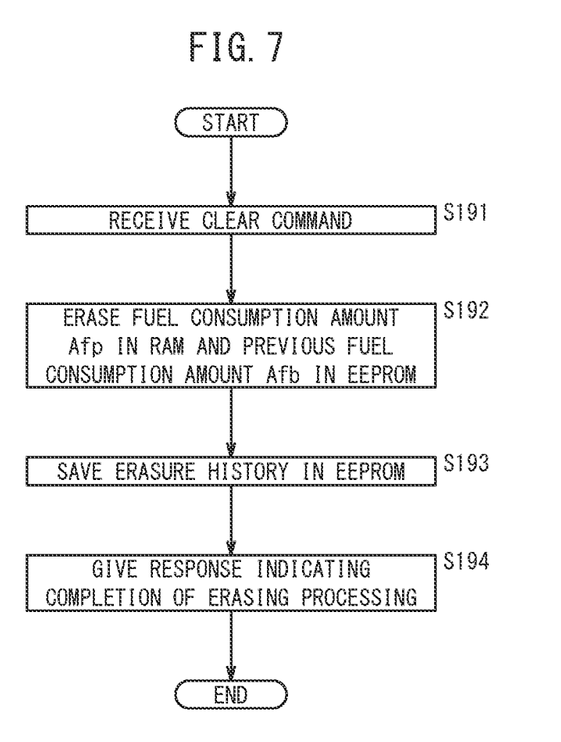
FIG. 7 is a flowchart showing processing of erasing fuel consumption amount data.

The operation of (the CPU 32 of) the engine ECU 24 that has received the clear command will be described with reference to FIG. 7.

In step S191, the engine ECU 24 receives the clear command from the external diagnosis device 14. In step S192, the engine ECU 24 erases (resets) the fuel consumption amount Afp held in the RAM 36 and the previous fuel consumption amount Afb held in the EEPROM 34.

In step S193, the engine ECU 24 saves the erasure history in the EEPROM 34. The process proceeds to step S194, and the engine ECU 24 gives a response indicating that the erasing processing has been completed, to the external diagnosis device 14.

In step S192, the engine ECU 24 may simultaneously erase the fuel consumption amount Afp and the previous fuel consumption amount Afb. Alternatively, the engine ECU 24 may first erase one of the fuel consumption amount Afp and the previous fuel consumption amount Afb, and then erase the remaining one.

The external diagnosis device 14 receives the response indicating that the erasing processing has been completed, from the engine ECU 24. Returning to FIG. 6, in step S20, the display unit 64 displays completion of the erasing processing. As a result, the processing related to the fuel consumption amount determination ends.

In the case where the operator does not perform the operation of pressing down the fuel consumption amount erase button (step S18: NO), the clear command is not transmitted to the engine ECU 24. In this case, after the elapse of a predetermined time, the processing related to the fuel consumption amount determination ends. The case where the operation of pressing down the fuel consumption amount erase button is not performed is, for example, a case where the operator desires to end the processing after confirming only the value of the fuel consumption amount Afp of the vehicle 12 and the result of the fuel consumption amount determination.

[Operation Flow in which Modified Example is Applied to Production Line]

Figure 8:
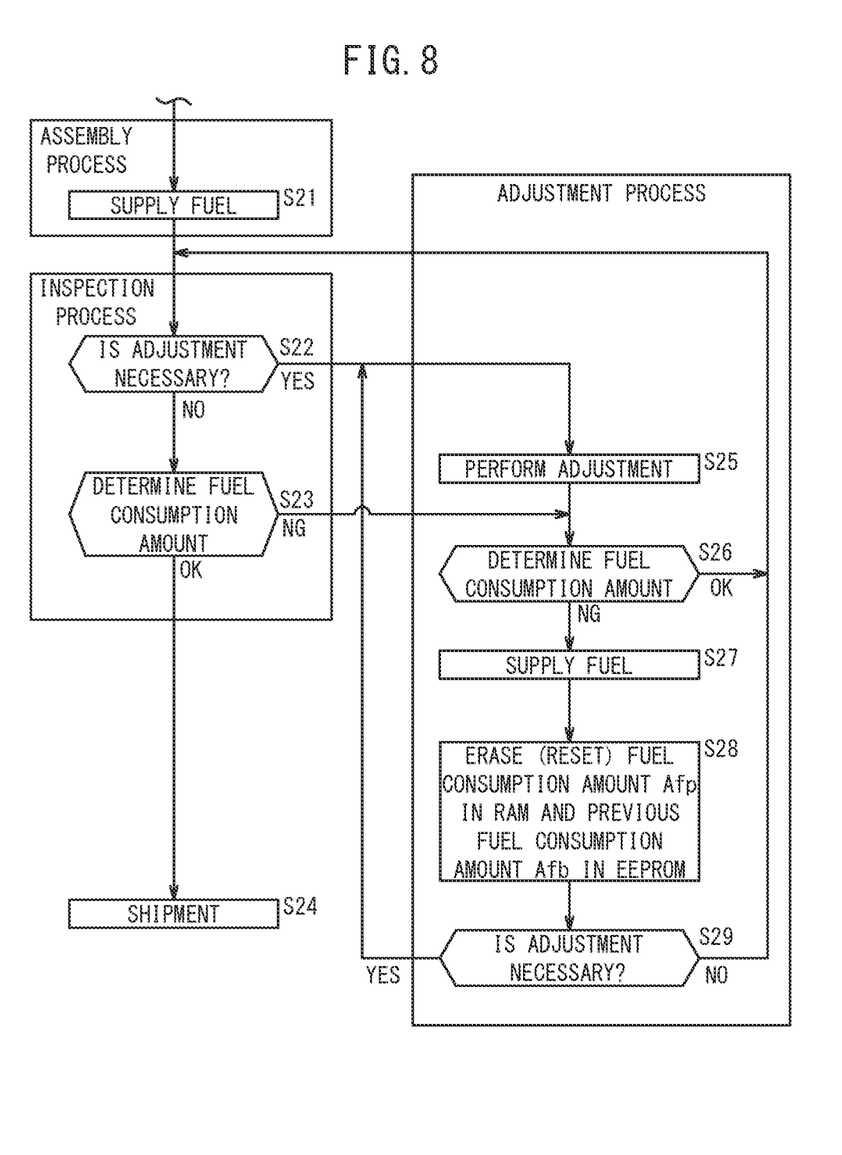
FIG. 8 is a flowchart showing an example of an operation flow in which the modified example is applied to the production line of the vehicle.

Next, an operation flow, in which the above-described modified example is applied to an inspection process and an adjustment process in the production line of the vehicle 12, will be described with reference to FIG. 8.

First, at the end of the assembly process, fuel for traveling or the like in the subsequent processes (an inspection process and a logistics process in this modified example) after the assembly process is supplied to the vehicle 12 by an automated fuel dispenser or the like (step S21).

Next, the process proceeds to step S22. In the inspection process, the operator inspects whether or not the adjustment work is necessary for the vehicle 12. The inspection items are, for example, whether or not adjustment work is necessary for welded portions, and whether or not adjustment work is necessary for assembling components. Here, a case is explained where it is determined that the adjustment work is not necessary (step S22: NO).

Next, in step S23, the operator performs fuel consumption amount determination by using the external diagnosis device 14. The fuel consumption amount determination processing corresponds to steps S11 to S17 in FIGS. 4 and 6. When the result of the fuel consumption amount determination is "pass (OK)" (step S23: OK), the process proceeds to step S24. The vehicle 12 is shipped from the factory and proceeds to the logistics process. When the result of the fuel consumption amount determination is "fail (NG)" (step S23: NG), the process proceeds to step S26 described later.

On the other hand, when it is determined in step S22 that the adjustment work is necessary for the vehicle 12 (step S22: YES), the vehicle 12 is moved out of the production line, and is then returned to the manufacturing process according to the item for which the adjustment work is necessary. (For example, when the adjustment work is necessary for welded portions, the vehicle 12 is returned to the welding process, and when the adjustment work is necessary for assembling components, the vehicle 12 is returned to the assembly process.)

When the adjustment work of the vehicle 12 is completed in step S25, the process proceeds to step S26. The operator uses the external diagnosis device 14 to perform fuel consumption amount determination. The fuel consumption amount determination processing corresponds to steps S11 to S17 in FIGS. 4 and 6.

In step S26, when the result of the fuel consumption amount determination is "pass (OK)" (step S26: OK), the vehicle 12 is returned to the inspection process, and the process proceeds to step S22.

In step S26, when the result of the fuel consumption amount determination is "fail (NG)" (step S26: NG), the process proceeds to step S27. The operator supplies additional fuel to the vehicle 12 based on an instruction from the external diagnosis device 14.

Next, in step S28, the operator performs an operation of pressing down the fuel consumption amount erase button to erase the fuel consumption amount Afp and the previous fuel consumption amount Afb that are recorded in the engine ECU 24. The erasing processing corresponds to steps S18 to S20 in FIG. 6.

In step S29, it is determined whether further adjustment work is necessary for the vehicle 12. When it is determined that the adjustment work is not necessary (step S29: NO), the vehicle 12 is returned to the inspection process, and the process proceeds to step S22.

When it is determined in step S29 that the adjustment work is still necessary (step S29: YES), the vehicle 12 is returned to step S25, and the adjustment work is performed again on the vehicle 12.

Hereinafter, the invention that can be grasped from the above-described embodiment and modified example will be described. For convenience of understanding, the components are denoted by the reference numerals used in the above-described embodiment and modified example. However, the components are not limited to those denoted by the reference numerals.

The vehicle diagnosis method according to the present invention is a vehicle diagnosis method for, after fuel is supplied to a vehicle 12 in a production line of the vehicle 12, diagnosing whether or not a fuel consumption amount Afp of the vehicle 12 is appropriate by using an external diagnosis device 14 that communicates with an engine ECU (electronic control unit) 24 mounted on the vehicle 12, the vehicle diagnosis method comprising: a step of causing the engine ECU 24 to calculate and store a fuel consumption amount Afp (step S4); a step of causing the external diagnosis device 14 to acquire the fuel consumption amount Afp from the engine ECU 24 (step S13); a step of causing the external diagnosis device 14 to determine whether the fuel consumption amount Afp is equal to or less than a threshold value Th (step S14); and a step of causing the external diagnosis device 14 to permit transfer of the vehicle 12 to a next process (step S15) when determining that the fuel consumption amount Afp is equal to or less than the threshold value Th (step S14: YES), and to give an instruction to supply additional fuel (step S17) when determining that the fuel consumption amount Afp is greater than the threshold value Th (step S14: NO).

According to this feature, after the fuel is supplied to the vehicle 12 in the production line of the vehicle 12, the operator can supply (inject) additional fuel according to an actual fuel consumption amount Afp. Therefore, the fuel required for each vehicle can be supplied thereto without excess or deficiency while reducing the initial fuel supply amount for the vehicle 12 to the minimum necessary amount. It is possible to optimize the fuel supply amount (including the additional fuel supply amount) for the vehicles 12 in the entire plant (factory).

The threshold value Th may be set based on an amount of fuel required for the vehicle 12 to travel in the plant (factory) after the fuel is supplied to the vehicle 12 in the production line. Thus, the fuel in an amount required in the logistics process or the like after the vehicle 12 is shipped from the factory can be reliably left in the fuel tank. This can prevent fuel shortage after the vehicle 12 is shipped from the factory.

Further, the amount of fuel required for the vehicle 12 to travel in the plant (factory) may include an amount of fuel required for idling. Thus, the fuel in an amount required in the logistics process or the like after the vehicle 12 is shipped from the factory can be reliably left in the fuel tank. This can prevent fuel shortage after the vehicle 12 is shipped from the factory Furthermore, the vehicle diagnosis method may further comprise, after the step of causing the external diagnosis device 14 to determine whether or not the fuel consumption amount Afp is equal to or less than the threshold value Th (step S14), a step of causing the engine ECU 24 to erase the fuel consumption amount Afp based on an instruction from the external diagnosis device 14 (step S19).

According to this feature, for example, in a case where the operator supplies additional fuel to the vehicle 12, the engine ECU 24 can calculate and store the fuel consumption amount Afp after the additional fuel is supplied. Therefore, in the next fuel consumption amount determination, it is possible to determine whether or not the fuel consumption amount Afp after the additional fuel is supplied is appropriate.

Furthermore, the fuel consumption amount Afp may be calculated based on a fuel injection amount $\Delta$Afi of an injector 28. According to this feature, it is possible to calculate the fuel consumption amount Afp more accurately than with other fuel consumption amount calculation methods such as a full tank method.

Furthermore, the engine ECU 24 may include a RAM 36 (volatile memory) and a nonvolatile memory such as an EEPROM 34, and the step of causing the engine ECU 24 to calculate and store the fuel consumption amount Afp (step S3 and step S4) may include a step of causing the engine ECU 24 to read the fuel consumption amount Afp from the RAM 36 and store the fuel consumption amount Afp in the EEPROM 34 as a previous fuel consumption amount Afb, when an ignition switch (IGSW) 26 is turned off (step S6), and a step of causing the engine ECU 24 to write the previous fuel consumption amount Afb stored in the EEPROM 34, into the RAM 36 as the fuel consumption amount Afp, when the IGSW 26 is turned off and then turned on again (step S2).

When the IGSW 26 is turned off in the inspection process or the like, the power supply to the RAM 36 is stopped and the information related to the fuel consumption amount Afp stored in the RAM 36 is erased. However, when the IGSW 26 is turned on again, the previous fuel consumption amount Afb at the time when the IGSW 26 is turned off is written into the RAM 36 as the fuel consumption amount Afp. Therefore, the engine ECU 24 can continuously calculate and store the fuel consumption amount Afp regardless of the ON/OFF operation of the IGSW 26.

The vehicle diagnosis system according to the present invention is a vehicle diagnosis system 10 that, after fuel is supplied to a vehicle 12 in a production line of the vehicle 12, diagnoses whether or not a fuel consumption amount Afp of the vehicle 12 is appropriate by using an external diagnosis device 14 that communicates with an engine ECU 24 mounted on the vehicle 12, wherein the engine ECU 24 includes a RAM 36 (storage unit) configured to store a fuel consumption amount Afp, the external diagnosis device 14 includes a fuel consumption amount acquisition unit 58 configured to acquire the fuel consumption amount Afp from the engine ECU 24, and a fuel consumption amount determination unit 60 configured to determine whether or not the fuel consumption amount Afp is equal to or less than a threshold value Th, and the fuel consumption amount determination unit 60 permits transfer of the vehicle 12 to a next process when determining that the fuel consumption amount Afp is equal to or less than the threshold value Th, and gives an instruction to supply additional fuel when determining that the fuel consumption amount Afp is greater than the threshold value Th.

According to this feature, after the fuel is supplied to the vehicle 12 in the production line of the vehicle 12, the operator can supply additional fuel according to an actual fuel consumption amount Afp. Therefore, the fuel required for each vehicle can be supplied thereto without excess or deficiency while reducing the initial fuel supply amount for the vehicle 12 to the minimum necessary amount. It is possible to optimize the fuel supply amount (including the additional fuel supply amount) for the vehicles 12 in the entire plant (factory).

Further, the external diagnosis device according to the present invention is an external diagnosis device 14 that, after fuel is supplied to a vehicle 12 in a production line of the vehicle 12, diagnoses whether or not a fuel consumption amount Afp of the vehicle 12 is appropriate by communicating with an engine ECU 24 mounted on the vehicle 12, the external diagnosis device 14 comprising a fuel consumption amount acquisition unit 58 configured to acquire the fuel consumption amount Afp from the engine ECU 24, and a fuel consumption amount determination unit 60 configured to determine whether or not the fuel consumption amount Afp is equal to or less than a threshold value Th, and the fuel consumption amount determination unit 60 permits transfer of the vehicle 12 to a next process when determining that the fuel consumption amount Afp is equal to or less than the threshold value Th, and gives an instruction to supply additional fuel when determining that the fuel consumption amount Afp is greater than the threshold value Th.

According to this feature, after the fuel is supplied do the vehicle 12 in the production line of the vehicle 12, the operator can supply additional fuel according to an actual fuel consumption amount Afp. Therefore, the fuel required for each vehicle can be supplied thereto without excess or deficiency while reducing the initial fuel supply amount for the vehicle 12 to the minimum necessary amount. It is possible to optimize the fuel supply amount (including the additional fuel supply amount) for the vehicles 12 in the entire plant (factory).

In the above-described embodiment, the determination result is displayed in step S16 in FIG. 4, and thereafter, the instruction is displayed in step S17 in FIG. 4. However, the determination result and the instruction may be displayed simultaneously. For example, if "Gas Consumption: 3.0 L/Shipment: NG/Please supply additional fuel" is displayed, the operator can instantly determine whether or not it is necessary to supply additional fuel to the vehicle 12. Therefore, it is possible to reduce time loss of work.

In addition, in the above-described embodiment, the determination results are displayed in step S15 and step S16 in FIG. 4 and the instruction is displayed in step S17 in FIG. 4 on the display unit 64 of the external diagnosis device 14, however the determination results and the instruction may be displayed on a separate display unit provided in the vehicle 12, such as an instrument meter of an instrument panel (not shown) of the vehicle 12 or a display of a car navigation system of the vehicle 12.

It should be noted that the present invention is not limited to the above-described embodiment and can adopt various configurations without departing from the gist of the present invention.

What is claim is:

1. A vehicle diagnosis method in a vehicle production line for, after fuel is supplied to a vehicle in a production line of the vehicle, diagnosing whether or not a fuel consumption amount of the vehicle is appropriate by using an external diagnosis device configured to communicate with an electronic control unit mounted on the vehicle, wherein
   the external diagnosis device is a terminal that is portable by an operator,
   the external diagnosis device includes
      a display unit that displays a work instruction for the operator,
      one or more processors that execute computer-executable instructions stored in a memory, and
      a connector that connects the one or more processors and the electronic control unit via a communication cable,
   the electronic control unit calculates the fuel consumption amount based on a fuel injection amount of an injector,
   the one or more processors execute the computer-executable instructions to cause the external diagnosis device:
   to acquire the fuel consumption amount from the electronic control unit;
   to determine whether or not the fuel consumption amount is equal to or less than a threshold value;
   to display, on the display unit, permission for transferring the vehicle to a next process when determining that the fuel consumption amount is equal to or less than the threshold value, and to display, on the display unit, an instruction to supply additional fuel when determining that the fuel consumption amount is greater than the threshold value; and
   in response to the permission for transferring the vehicle and determining that the fuel consumption amount is equal to or less than the threshold value, the vehicle is moved off the vehicle production line and out of a factory.

2. The vehicle diagnosis method in the vehicle production line according to claim 1, wherein
   the threshold value is set based on an amount of fuel required for the vehicle to travel in a plant after the fuel is supplied to the vehicle in the production line.

3. The vehicle diagnosis method in the vehicle production line according to claim 2, wherein
   the amount of fuel required for the vehicle to travel in the plant includes an amount of fuel required for idling.

4. The vehicle diagnosis method in the vehicle production line according to claim 1, wherein after the external diagnosis device determines whether or not the fuel consumption amount is equal to or less than the threshold value, the electronic control unit erases the fuel consumption amount based on an instruction from the external diagnosis device.

5. The vehicle diagnosis method in the vehicle production line according to claim 1, wherein
   the electronic control unit comprises a volatile memory and a nonvolatile memory, and
   in a case that the electronic control unit calculates the fuel consumption amount,
   the electronic control unit reads the fuel consumption amount from the volatile memory and store the fuel consumption amount in the nonvolatile memory as a previous fuel consumption amount, when an ignition switch is turned off; and
   the electronic control unit writes the previous fuel consumption amount stored in the nonvolatile memory, into the volatile memory as the fuel consumption amount, when the ignition switch is turned off and then turned on again.

* * * * *